(12) United States Patent
Manjunath et al.

(10) Patent No.: US 12,120,156 B2
(45) Date of Patent: Oct. 15, 2024

(54) METHOD AND ELECTRONIC DEVICE FOR PROVIDING SEAMLESS CONTINUITY OF DATA CHANNEL SESSION

(71) Applicant: SAMSUNG ELECTRONICS CO., LTD., Suwon-si (KR)

(72) Inventors: Madhusudan Gorur Manjunath, Bangalore (IN); Kaja Mohaideen M, Bangalore (IN); Sreenivasa Dhamaragunta Reddy, Bangalore (IN); Srinidhi N, Bangalore (IN); Sunil Kumar Nagaraju, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/309,216

(22) Filed: Apr. 28, 2023

(65) Prior Publication Data
US 2023/0353602 A1 Nov. 2, 2023

Related U.S. Application Data

(63) Continuation of application No. PCT/KR2023/005787, filed on Apr. 27, 2023.

(30) Foreign Application Priority Data

Apr. 28, 2022 (IN) .............................. 202241024919
Apr. 11, 2023 (IN) .............................. 202241024919

(51) Int. Cl.
*G06F 9/48* (2006.01)
*G06F 8/61* (2018.01)
(Continued)

(52) U.S. Cl.
CPC ............ *H04L 65/1069* (2013.01); *G06F 8/61* (2013.01); *G06F 9/485* (2013.01);
(Continued)

(58) Field of Classification Search
CPC ......... H04M 1/72403; H04M 1/72484; H04M 3/2218; H04M 7/0033; H04M 1/2757;
(Continued)

(56) References Cited

U.S. PATENT DOCUMENTS

2005/0101261 A1* 5/2005 Weinzweig ....... H04M 1/72502
 455/74.1
2011/0125913 A1 5/2011 Maes
(Continued)

FOREIGN PATENT DOCUMENTS

| CN | 101690099 | 3/2010 | |
|---|---|---|---|
| CN | 108964984 | 12/2018 | |
| EP | 2387217 A3 * | 12/2013 | ............. G06F 9/485 |

OTHER PUBLICATIONS

Search Report dated Aug. 4, 2023 in International Patent Application No. PCT/KR2023/005787.
(Continued)

*Primary Examiner* — Kyung H Shin
(74) *Attorney, Agent, or Firm* — Nixon & Vanderhye, P.C.

(57) ABSTRACT

A method for communication by an electronic device is provided. The method comprises determining establishment of a data channel during an ongoing call with another electronic device; determining at least one application displayed on the electronic device and the another electronic device over the data channel during the ongoing call; determining a disconnection of the ongoing call between the electronic device and the another electronic device; and storing (508) a state of the at least one application in a memory of the electronic device based on determining the disconnection of the ongoing call, wherein the stored state of the at least one application is used for execution of the at least one application during another call.

18 Claims, 12 Drawing Sheets

(51) Int. Cl.
*H04L 65/1069* (2022.01)
*H04L 65/1095* (2022.01)
*H04L 65/1096* (2022.01)
*H04M 1/72502* (2021.01)
*H04M 3/22* (2006.01)

(52) U.S. Cl.
CPC ...... *H04L 65/1095* (2022.05); *H04L 65/1096* (2013.01); *H04M 1/72502* (2013.01); *H04M 3/2218* (2013.01)

(58) Field of Classification Search
CPC ......... H04M 3/42042; H04M 3/42068; H04M 1/575; H04M 1/72502; G06F 9/485; G06F 9/452; G06F 8/61; G06F 9/44526; H04L 67/75; H04L 65/1069; H04L 67/565; H04L 67/01; H04W 92/02
See application file for complete search history.

(56) References Cited

U.S. PATENT DOCUMENTS

| | | | |
|---|---|---|---|
| 2011/0283296 A1* | 11/2011 | Chun | G06F 9/485 719/318 |
| 2013/0332664 A1 | 12/2013 | McGowan | |
| 2015/0095504 A1 | 4/2015 | Kunniyur et al. | |
| 2015/0134759 A1 | 5/2015 | Pattan et al. | |
| 2016/0191363 A1 | 6/2016 | Haraszti et al. | |
| 2017/0214789 A1 | 7/2017 | Jung et al. | |
| 2017/0331812 A1 | 11/2017 | Lander et al. | |
| 2018/0278744 A1* | 9/2018 | Kim | H04M 3/2218 |
| 2019/0020722 A1 | 1/2019 | Haraszti et al. | |
| 2020/0117489 A1* | 4/2020 | Borkar | G06F 8/61 |
| 2021/0127305 A1 | 4/2021 | Xu et al. | |

OTHER PUBLICATIONS

Written Opinion dated Aug. 4, 2023 in International Patent Application No. PCT/KR2023/005787.

Telang Mahesh et al., Data Continuity During an Ongoing Priority Data Call Activity, https://www.tdcommons.org/dpubs_series/3112, Apr. 9, 2020, 9 pages.

Examination Report dated Apr. 15, 2024 in Indian Patent Application No. 202241024919 and English-language translation.

* cited by examiner

METHOD AND ELECTRONIC DEVICE FOR PROVIDING SEAMLESS CONTINUITY OF DATA CHANNEL SESSION

CROSS-REFERENCE TO RELATED APPLICATIONS

The application is a continuation of PCT/KR2023/005787, designating the United States, filed Apr. 27, 2023, in the Korean Intellectual Property Receiving Office and claims priority to Indian Provisional Application No. 202241024919, filed Apr. 28, 2022, in the Indian Patent Office and to Indian Complete Application No. 202241024919, filed Apr. 11, 2023, in the Indian Patent Office. The disclosures of each of these applications are incorporated by reference herein in their entireties.

BACKGROUND

Field

The disclosure relates to electronic devices, and, more specifically, to a method and an electronic device for providing seamless continuity of data channel session.

Description of Related Art

With advancement in technology, internet protocol (IP) Multimedia Subsystem (IMS) Data channel (IDC) was introduced in $3^{rd}$ generation partnership programme (3GPP) Rel-16. The IDC works with $4^{th}$ generation (4G) or $5^{th}$ generation (5G) mobile core networks to deliver voice calls, messages and other real-time services. The real-time services which can be initiated on an active IDC includes for example but not limited to, interactive 5G services during a Voice over New radio (VoNR) Call, robotics, augmented reality (AR), virtual reality (VR), provide games, interactive business calls, share content etc.

However, when the real-time services or applications are initiated during an on-going call in an IDC session, conventional methods lack support for continuity of the IDC session when a user ends an on-going call manually or when the on-going call is dropped due to device or network issues. For example, when two users have initiated a game application during the on-going call and reached level 5. If the on-going call ends, the session status of the game application is lost. Therefore, when the two users interact over a call again and decide to initiate the same game application then the game application is loaded from level 1 and not level 5. As a result, a user progress associated with the game application is lost, potentially resulting in irritability to the users. Thus, it would be desirable to at least provide a mechanism for mitigating such situations.

Example embodiments disclosed can provide a method and electronic device for providing seamless continuity of a data channel session during an ongoing call. In conventional methods, when a user ends an on-going call manually or the on-going call is dropped, there is no mechanism for providing IDC continuity.

SUMMARY

The method and systems of the present disclosure can provide seamless continuity of a data channel session when an on-going call gets terminated or when a user wants to pull an on-going call to a secondary electronic device. The IDC continuity is provided, for example, by storing a state of the data channel session to a local or a server environment.

Accordingly, example embodiments herein disclose a method for communication by an electronic device. The method includes determining establishment of a data channel during an ongoing call with another electronic device and determining at least one application displayed on the electronic device and the another electronic device over the data channel during the ongoing call. Further, the method also includes determining a disconnection of the ongoing call between the electronic device and the another electronic device; and storing a state of the at least one application in a memory of the electronic device based on determining the disconnection of the ongoing call. The stored state of the at least one application may be used for execution of the at least one application during another call.

In an example embodiment, the state of the at least one application is stored in the memory of the electronic device using at least one first application programming interface (API).

In an example embodiment, the method includes determining, by the electronic device, a re-establishment of a disconnected call and the data channel and determining, by the electronic device, a selection of the at least one application to be displayed to the electronic device and the another electronic device over the data channel. The method also includes determining, by the electronic device, an availability of the state of the at least one application in the memory of the electronic device; determining, by the electronic device, a validity of the state of the at least one application is not expired, in response to determining the availability of the state of the at least one application in the memory of the electronic device; and retrieving, by the electronic device, the state of the at least one application from the memory of the electronic device using a second API. Further, the method includes loading, by the electronic device, the retrieved state of the at least one application; and displaying, by the electronic device, the retrieved state of the at least one application on the electronic device and the another electronic device.

In an example embodiment, the method includes determining, by the electronic device, the validity of the state of the at least one application is expired and discarding, by the electronic device, the state of the at least one application stored in the memory of the electronic device. The method also includes starting, by the electronic device, the at least one application with a new session state over the data channel during the ongoing call between the electronic device and the another electronic device.

In an example embodiment, the method includes initiating, by the electronic device, a synchronization procedure with a Call and Message Continuity (CMC) file storage server, in response to determining the disconnection of the ongoing call between the electronic device and the another electronic device. The method also includes uploading, by the electronic device, an application state file to the CMC file storage server using HTTP mechanism, and sending, by the electronic device, a uniform resource locator (URL) of the uploaded application state file in the CMC file storage server to a CMC Server. The CMC server sends the URL to the another electronic device to enable the another electronic device to download the application state file from the CMC file storage server.

In an example embodiment, the method includes sending, by the CMC server, a notification to the another electronic device to indicate to the another electronic device to download at least one of the application state file from the URL and receiving, by the another electronic device, the notification form the CMC server. The method also includes downloading, by the another electronic device, the application state file from the URL of the uploaded application state file; determining, by the another electronic device, initiation of the call and the data channel between the another electronic device and the electronic device; and reading, by the another electronic device, the state of the at least one application from the downloaded application state file from the URL of the uploaded application state file.

In an example embodiment, the method includes determining, by the electronic device, a call pulling activity is initiated for the ongoing call to another electronic device and indicating, by the electronic device, a call transfer to the at least one application using an IMS framework. The method also includes storing, by the electronic device, the state of the at least one application in the memory of the electronic device using the first API; uploading, by the electronic device, the application state file to at least one of the CMC file storage server and an operator server and sending, by the electronic device, the URL of the uploaded application state file in at least one of the CMC file storage server and the operator server, to the another electronic device to enable the another electronic device to download the application state file. The application state file comprises the state of the at least one application.

In an example embodiment, the method includes receiving, by the another electronic device, a notification form the CMC server, indicating to the another electronic device to download the application state file from the URL of the uploaded application state file and downloading, by the another electronic device, the application state file from the URL of the uploaded application state file. Further, the method also includes determining, by the another electronic device, pulling of the call and the data channel between the another electronic device and the electronic device and reading, by the another electronic device, the state of the at least one application from the downloaded application state file from the CMC server. The method also includes loading, by the another electronic device, the state of the at least one application from the downloaded application state file; and displaying, by the another electronic device, the at least one application in the session state from the downloaded application state file on the another electronic device.

In an example embodiment, the method includes receiving, by the another electronic device, a notification from an operator server, indicating to the another electronic device to download the application state file from the URL of the uploaded application state file and downloading, by the another electronic device, the application state file from the URL of the uploaded application state file. The method also includes initiating, by the another electronic device, a bootstrap and downloading an application menu from the operator server and selecting, by the another electronic device, the at least one application from the state of the at least one application from the application menu. The method also includes loading, by the another electronic device, the state of the at least one application from the downloaded application state file; and displaying, by the another electronic device, the at least one application in the session state from the downloaded application state file on the another electronic device.

Various example embodiments herein provide an electronic device. The electronic device includes a memory, and at least one processor coupled to the memory. The at least one processor controller is configured to determine establishment of a data channel during an ongoing call with another electronic device and determine at least one application displayed on the electronic device and the another electronic device over the data channel during the ongoing call. Further, the at least one processor is configured to determine a disconnection of the ongoing call between the electronic device and the another electronic device; and store a state of the at least one application in a memory of the electronic device based on determining the disconnection of the ongoing call. The stored state of the at least one application may be used for execution of the at least one application during another call.

Various example embodiments herein provide a non-transitory computer readable storage medium storing instructions which, when executed by at least one processor of an electronic device, causes the electronic device to perform operations. The operations includes determining establishment of a data channel during an ongoing call with another electronic device, determining at least one application displayed on the electronic device and the another electronic device over the data channel during the ongoing call, determining a disconnection of the ongoing call between the electronic device and the another electronic device, storing a state of the at least one application in a memory of the electronic device based on determining the disconnection of the ongoing call. The stored state of the at least one application may be used for execution of the at least one application during another call.

These and other aspects of the example embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1A:
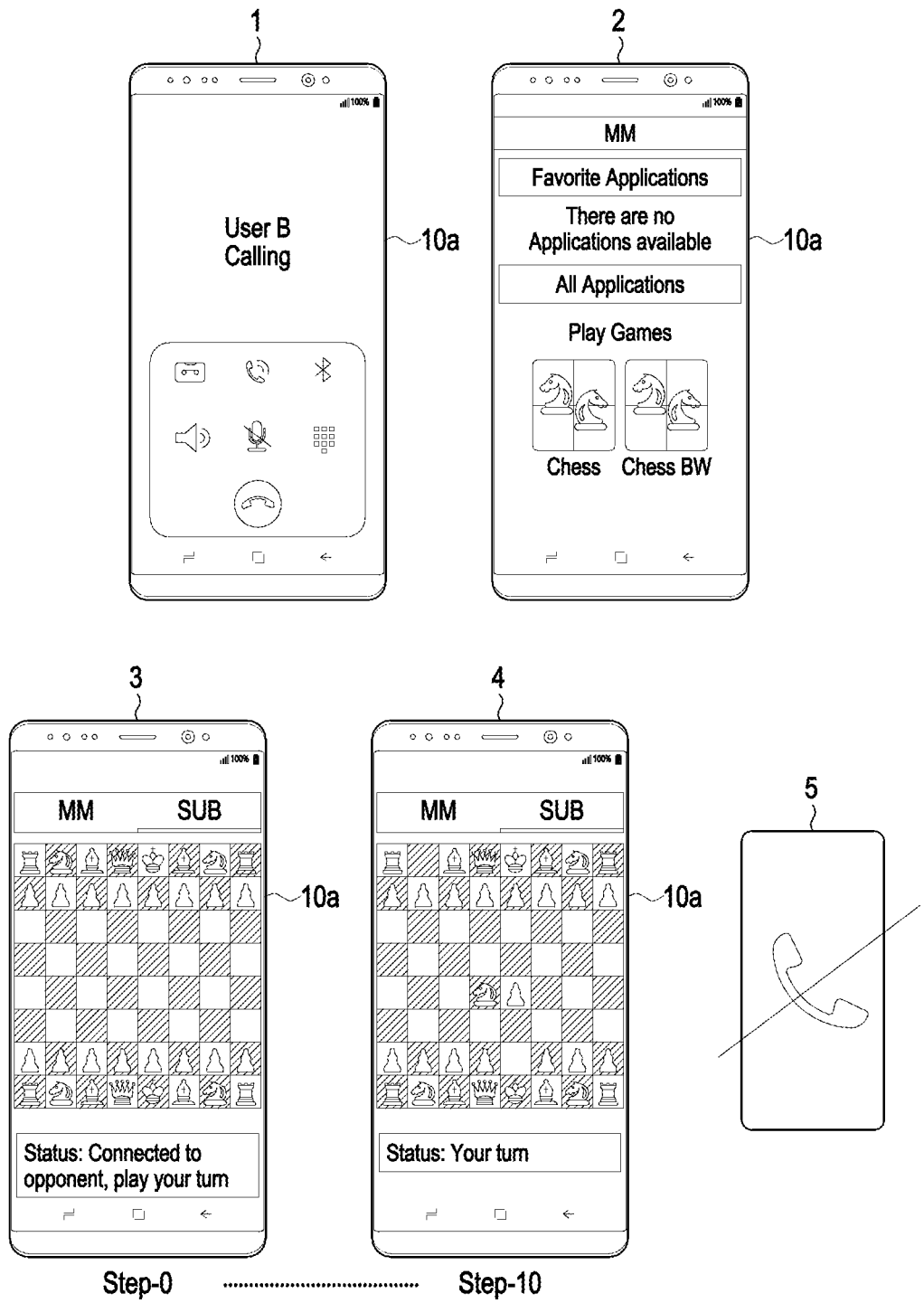
FIGS. 1A and 1B is an example illustrating a one-on-one call drop scenario during a chess game according to conventional art.

The embodiments herein and the various features and advantageous details thereof are explained more fully with reference to the non-limiting example embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as various embodiments can be combined to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Various example embodiments herein disclose a method for providing seamless continuity of a data channel session by an electronic device. The method includes determining, by the electronic device, establishment of a data channel during an ongoing call with another electronic device and determining, by the electronic device, at least one application displayed to the electronic device and the another electronic device over the data channel during the ongoing call. The method also includes determining, by the electronic device, a disconnection of the ongoing call between the electronic device and the another electronic device; and storing, by the electronic device, a state of the at least one application in a memory of the electronic device.

Various example embodiments herein disclose an electronic device for providing seamless continuity of a data channel session. The electronic device includes a memory, a processor, a communicator (including, e.g., communication circuitry) and data channel management controller. The data channel management controller is configured to determine establishment of a data channel during an ongoing call with another electronic device and determine at least one application displayed to the electronic device and the another electronic device over the data channel during the ongoing call. Further, the data channel management controller is configured to determine a disconnection of the ongoing call between the electronic device and the another electronic device; and store a state of the at least one application in a memory of the electronic device.

Unlike conventional methods and systems, the methods and systems of the present disclosure can store an IDC Java script app to local storage when an ongoing VoNR call gets disconnected either abruptly or user ended. When a new call is made to the same user, the stored Java script object state is read from local storage and loaded to the application, so that user can continue using the application from where it was stopped last time. This storing and retrieving of an IDC JS state can provide seamless continuity of session.

Unlike conventional methods and systems, the methods and systems of the present disclosure can synchronize an IDC Java Script application state to all secondary electronic devices using Call and Message Continuity (CMC), so that when a user makes call to a same remote user from any of his or her secondary electronic devices, a previous IDC session, if any, may be continued.

Unlike conventional methods and systems, the methods and systems of the present disclosure can synchronize an IDC Java Script application state using a Common Message (CM) store to a secondary electronic device to which a user is transferring an on-going call, so that the IDC session can be continued from the secondary electronic device. This can be achieved using Network's operator CM store.

Unlike conventional methods and systems, the methods and systems of the present disclosure can store an IDC app state when an ongoing voice call gets terminated (e.g., either user ending call manually or a call drop due to network issues or device-side issues). When the call is connected again with same user, the IDC app can read the app state (e.g., JS state, DOM, etc.) from local storage using the APIs exposed by IMS and resume the app from the point it was stopped last time.

Unlike conventional methods and systems, the methods and systems of the present disclosure can provide new APIs exposed by an IMS framework in order to store and retrieve an IDC app state.

Unlike conventional methods and systems, the methods and systems of the present disclosure are not restricted to only 1-1 calls. For example, whenever a user wishes to transfer a call to any secondary electronic device, the user can transfer the IDC app state as well using operators Data Store Service (e.g., CM store) and the IDC app state will be synchronized to the CM store using HTTP protocol.

Unlike conventional methods and systems, the methods and systems of the present disclosure can pull an ongoing 5G voice call to any secondary electric device whenever user wishes, and then, along with voice call, an IDC session can also be pulled.

Unlike conventional methods and systems, the methods and systems of the present disclosure can allow a user who wants to make a call again from any secondary electronic device like using the CMC feature, and an IDC session can also be continued from the secondary electronic device. The IDC app context may be synchronized to a CMC server using HTTP protocol.

Referring now to the drawings, and more particularly to FIGS. 4 through 10, in which similar reference characters denote corresponding features consistently throughout the figures, there are shown various example embodiments.

Unlike conventional methods and systems, the methods and systems of the present disclosure can address a lack of IDC continuity support when a user ends a call manually or a call is dropped due to device or network issues.

Figure 1B:
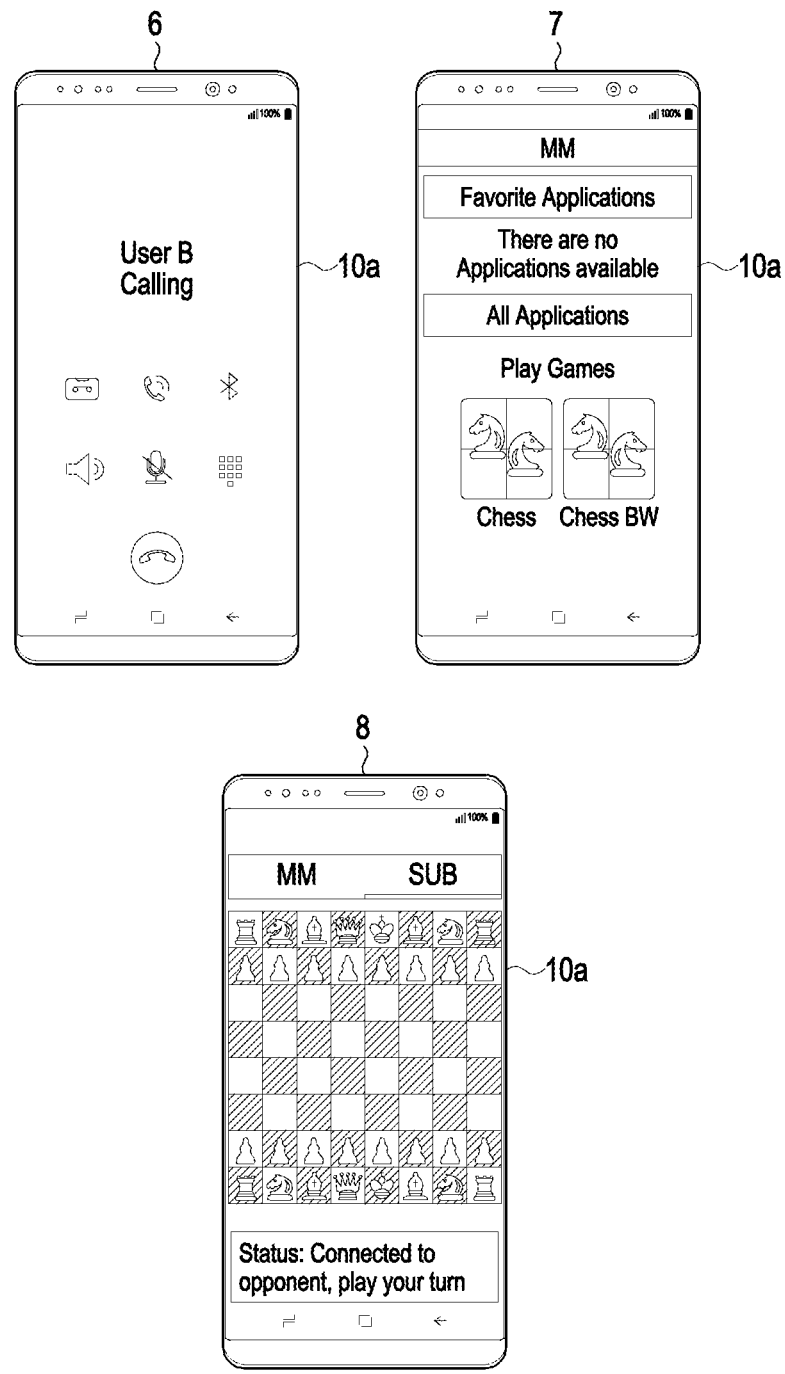

FIGS. 1A and 1B illustrate a one-on-one call drop scenario during a chess game according to conventional art.

Referring to FIGS. 1A and 1B, at step 1 consider that an electronic device (10*a*) of a user A receives a call from a user B. At step 2, an IDC application session is initiated during the on-going call between the electronic device (10*a*) of the user A and an electronic device (10*b*) of a user B. In the IDC application session the users can opt to play chess game over the VoNR Call.

At steps 3 and 4, the user A and the user B make progress (proceed from step 0 to step 10) in the chess game being played in the IDC application session. At step 5, in the middle of the chess game the call gets dropped due to a network issue. When the on-going VoNR call gets disconnected, the IDC application session context is also lost, i.e., since the call got dropped, the chess game which is running in webview also gets cleared.

At step 6 (FIG. 1B), if the user A or the user B wishes to re-establish the call, then a new IDC application session needs to be established as the previous application context is lost. Both the users will have to start a new game. Therefore, the progress made by the user A and the user B in the chess game is lost (as seen from steps 7 and 8). This makes the process of interactive applications during a call a cumbersome process which can impact the user experience.

In another example scenario, if the user A or the user B wants to transfer the VoNR call to a secondary electronic device, then the application needs to be freshly launched as an existing session context cannot be transferred. Therefore, the users cannot obtain the continuity of the application session, which hampers the user experience of using the interactive calls.

In yet another example scenario, if the user wants to re-establish the VoNR call using a secondary electronic device, then the application needs to be newly launched as existing session context is not available in the secondary electronic device. Therefore, the user has to start the application from scratch and loses continuity of the session which was running at the time of termination of the on-going call.

Figure 2:
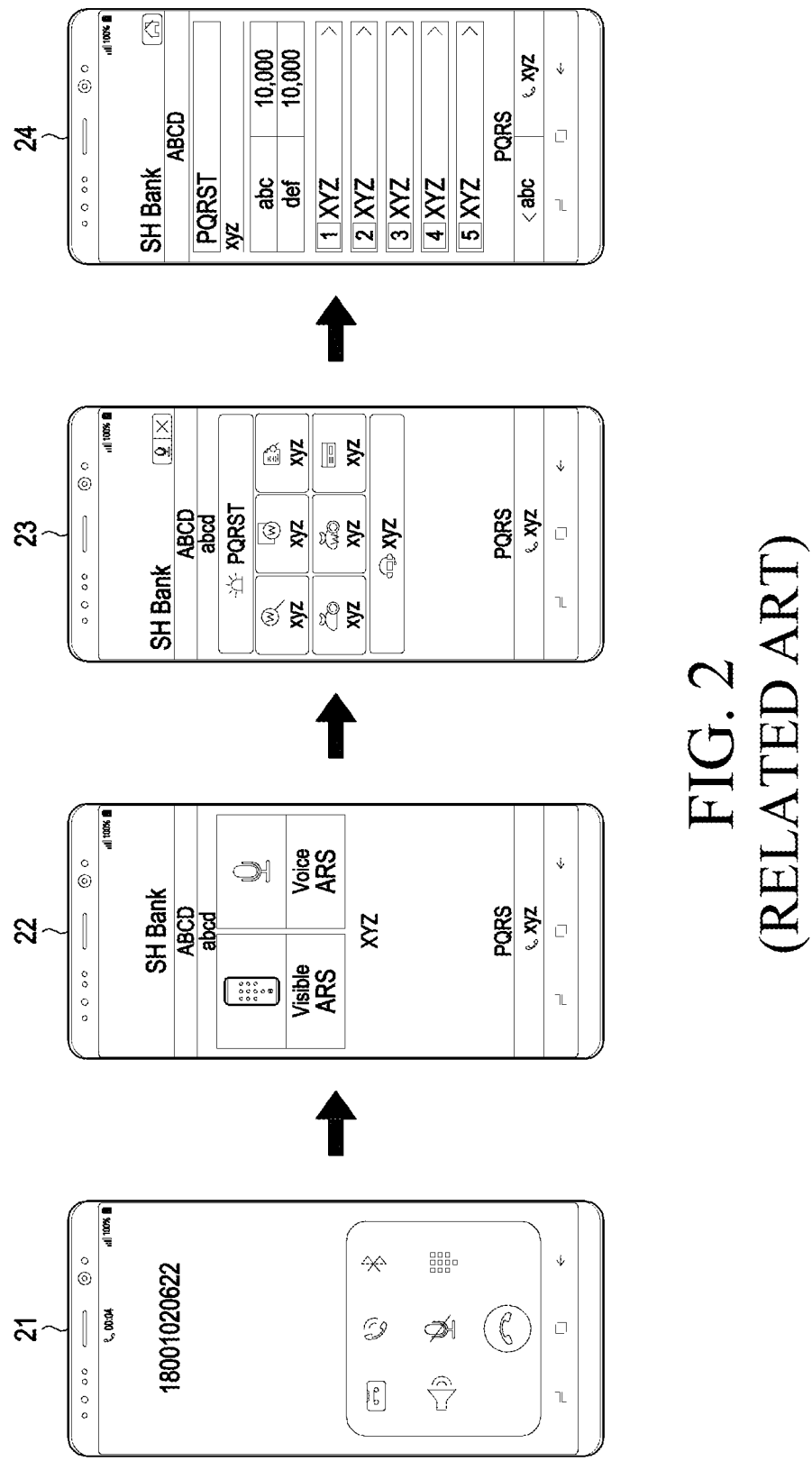
FIG. 2 is an example illustrating a one-on-one call drop scenario during interactive voice response (IVR) call according to conventional art.

FIG. 2 is an example illustrating a one-on-one call drop scenario during an interactive voice response (IVR) call according to conventional art. Referring to FIG. 2, consider a business to customer (B2C) interactive call. At step 21, the user calls a business number. From steps 22, 23, and 24, the user is asked to follow many steps as guided by customer care representative. Consider that the call gets terminated in the middle of the session. Even if the user connects back to the business number, the user will have to repeat the same steps from the beginning as guided by the customer care representative.

Figure 3:
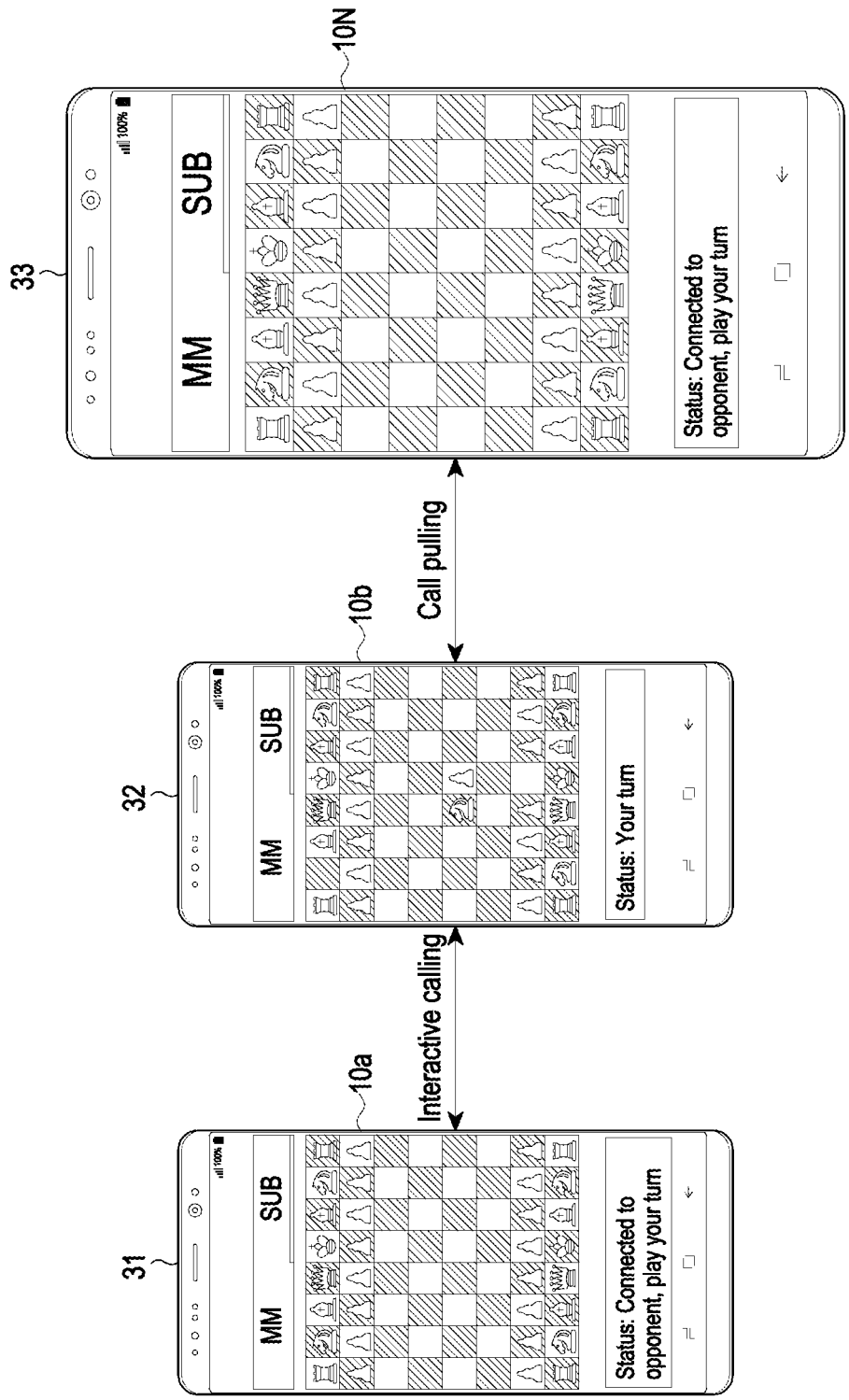
FIG. 3 is an example illustrating a scenario of Call Pulling in a multi-device scenario according to conventional art.

FIG. 3 is an example illustrating a scenario of call pulling in a multi-device scenario according to conventional art. Referring to FIG. 3, at steps 31 and 32, consider that a user A makes a call to a user B with interactive calling. Here, the user A and the user B have initiated playing the chess game and proceeded with the chess game. At step 33, if the user A wishes to pull the ongoing data channel session (like games, interactive call) along with audio/video call to any one of secondary electronic device (such as for example, the tablet in step 33), then the user A can pull only the call. The user A cannot pull the active data channel session. As a result, the user A and the user B will have to start the chess game from the beginning.

Figure 4:
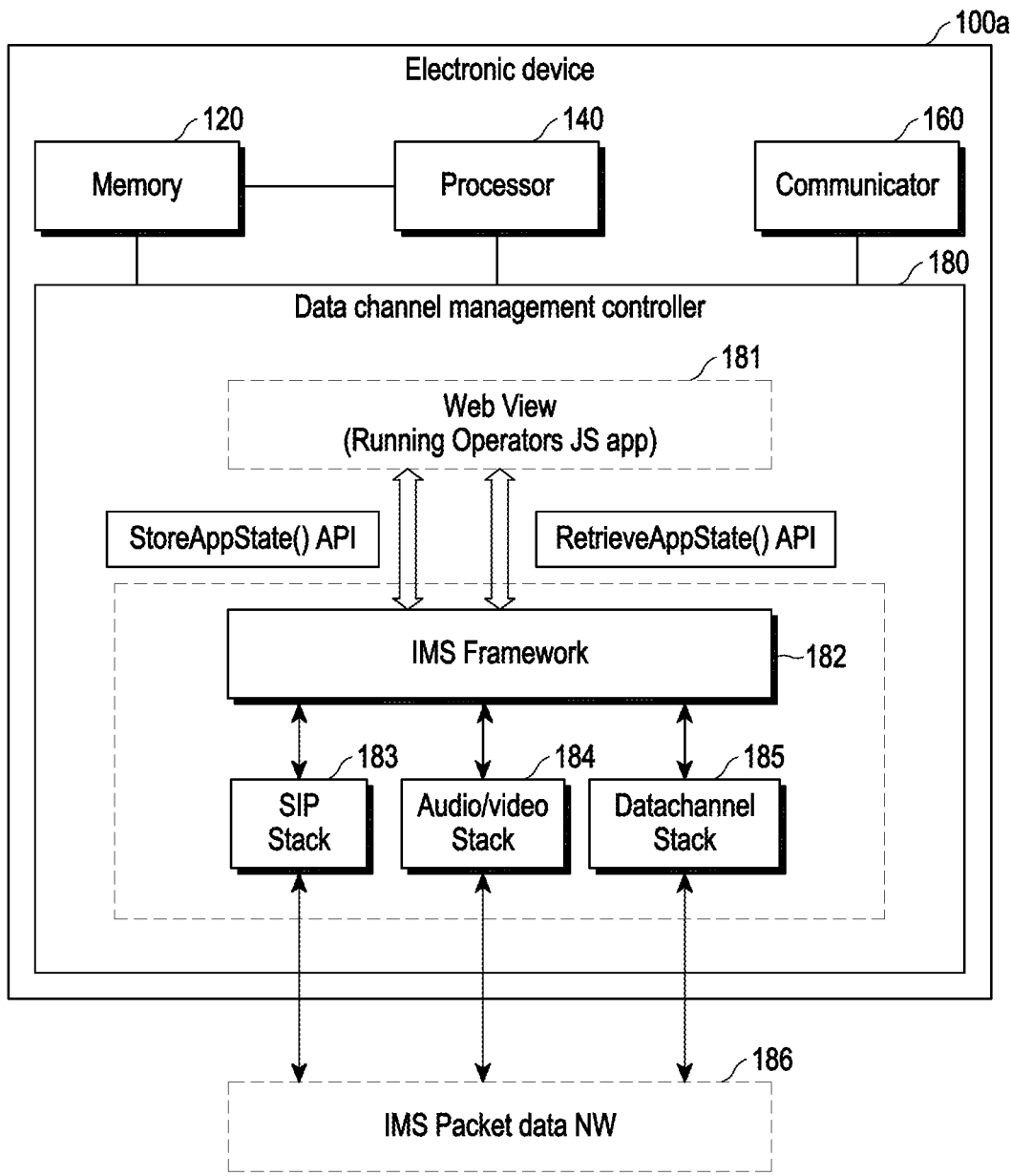
FIG. 4 is a block diagram of an example electronic device for providing seamless continuity of data channel session according to various embodiments.

FIG. 4 is a block diagram of an example electronic device (100) for providing seamless continuity of a data channel session according to various embodiments. Referring to the FIG. 4, the electronic device (100) can be for example, but is not limited to, a smartphone, a mobile phone, a tablet computer, a laptop computer, a palmtop computer, an AI speaker, an IoT sensor, a smart social robot, a Personal Digital Assistant (PDA), a music player, a video player, a wearable device, or the like.

In an embodiment, the electronic device (100*a*) (see FIG. 8A) includes a memory (120), a processor (140), a communicator (160), and a data channel management controller (180). A display (not shown) may also be included. The data channel management controller (180) may be implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors. The processor (140) and the channel management controller (180) may be integrally referred to as at least one processor.

The memory (120) may be configured to store instructions to be executed by the processor (140). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted as meaning that the memory (120) is non-movable. In various examples, the memory (120) can be configured to store larger amounts of information. In various examples, a non-transitory storage medium may store data that can, over time, change (e.g., in Random Access Memory (RAM) or cache).

The processor (140) (including, e.g., processing circuitry) communicates with the memory (120), the communicator (160) and the data channel management controller (180). The processor (140) may be configured to execute instructions stored in the memory (120) and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (160) includes an electronic circuit specific to a standard that enables wired or wireless communication. The communicator (160) is configured to communicate internally between internal hardware components of the electronic device (100) and with external devices via one or more networks.

In an embodiment, the data channel management controller (180) includes a Web View application (181), an IMS Framework (182), SIP stack (183), an audio/video stack (184) and a DataChannel Stack (185). Further, the data channel management controller (180) is connected to an IMS Packet Data NW (186).

The data channel management controller (180) is configured to determine the establishment of a data channel during an ongoing call with another electronic device (100b) and determine the Web View application (181) displayed to the electronic device (100a) and the another electronic device (100b) over the data channel during the ongoing call. The Web View application (181) is used to load web applications or IDC applications during interactive calling in an IDC session, such as for example a gaming application, a shopping application or various real-time services, for example, but not limited to, interactive 5G services during a Voice over New radio (VoNR) call, robotics, augmented reality (AR), virtual reality (VR), provide games, interactive business calls, share content, and the like. The IDC applications can be, for example, but are not limited to any kind of web application based on Java Script, Type Script, PHP, Perl, and like. The Web View application (181) can be part of a call application which is used to make the call between users or the Web View application (181) can be a separate application.

The IMS Framework (182) is part of an IMS package which enables interactive calling and performs various functions such as bootstrap, interaction with the Web View application (181), and the like.

The data channel management controller (180) includes the SIP stack (183), the audio or video stack (184) and the DataChannel Stack (185). The data channel management controller (180) is configured to determine a disconnection of the ongoing call between the electronic device (100a) and the another electronic device (100b) and store a state of the Web View application (181) in the memory (120) of the electronic device (100). The state of the Web View application (181) is stored in the memory (120) of the electronic device (100a) using a first application programming interface (API). When the data channel management controller (180) wants to store the state of the IDC application into a cache (local storage)/memory (120), then the data channel management controller (180) calls the first API of the IMS Framework (182) e.g., storeIDCState( ) with application state, application name, application version and a validity. A syntax is shown below:

```
/*
 * Retrieves json string corresponding to appName from IMS stack
 * @appName: Name of the IDC app which needs to be resumed
 * @version: current version of the app
 */
```

```
var retrieveIDCState(var appName, var version . . .) {
    /* Logic here to retrieve IDC App state from IMS stack */
}
```

The application state is a meta data of Class Object, DOM Objects, and the like in the format of JSON. The IMS Framework (182) dumps the meta data of the state of the application into an application state file or database (along with caller and callee information) and stores the application state file in the memory (120) of the electronic device (100a).

The data channel management controller (180) is further configured to determine a re-establishment of a disconnected call and data channel and determine a selection of the application to be displayed to the electronic device (100a) and the another electronic device (100b) over the data channel. The data channel management controller (180) is then configured to determine an availability of the state of the application in the memory (120) of the electronic device (100a) and determine that the state of the application is not expired at an instant of time (e.g., the current time). The data management controller (180) can retrieve the state of the application from the memory (120) of the electronic device (100a) using a second API. The second API of the IMS Framework (182) is retrieveIDCState( ) with application name and Version, the syntax is shown as follows:

```
/*
 * Stores json string corresponding to JS Object & DOM
 * @state: Json string representing JSON Object and DOM
 * @appName: Name of the JS app which JS Object belongs to
 * @version: current version of the JS app
 * @validity: Validity of the JS app
 */
void storeIDCState(var state, var appName, var version, var validity . . .) {
    /* Logic here to store IDC App state to IMS stack */
}
```

The IMS Framework (182) reads the file content matching with the Caller and the Callee information and then provides the application state meta data to the IDC application. Further, the data channel management controller (180) loads the retrieved state of the application and displays the retrieved state of the application on the electronic device (100a) and the another electronic device (100b).

If the data channel management controller (180) determines that the validity of the state of the application is expired at the instant of time (e.g., the current time), then the data channel management controller (180) discards the state of the application stored in the memory (120) of the electronic device (100a) and starts the application with a new session state over the data channel during the ongoing call between the electronic device (100a) and the another electronic device (100b).

In an embodiment, the data channel management controller (180) is configured to initiate a synchronization procedure with a Call and Message Continuity (CMC) file storage server (202) (FIG. 10) when the ongoing call between the electronic device (100a) and the another electronic device (100b) disconnects. Then, the data channel management controller (180) uploads an application state file to the CMC file storage server (202) using an HTTP mechanism and sends a uniform resource locator (URL) of the uploaded application state file in the CMC file storage server (202) to a CMC server (204). The CMC server (204) sends the URL to the another electronic device (100b) to enable the another electronic device (100b) to download the application state file from the CMC file storage server (202).

In an embodiment, the data channel management controller (180) is configured to determine a call pulling activity is initiated for the ongoing call to the another electronic device (100b) of the user and indicates a call transfer to the application using the IMS framework (182). Further, the data channel management controller (180) is configured to store the state of the application in the memory (120) of the electronic device (100a) using the first API, upload the application state file to the CMC file storage server (202) or an operator server (not shown) and send the URL of the uploaded application state file to the another electronic device (100b) to enable the another electronic device (100b) to download the application state file. The another electronic device (100b) displays the application in the session state from the downloaded application state file on determining pulling of the call and the data channel between the another electronic device (100b) and the electronic device (100a). The another electronic device (100b) displays the application in the session state from the downloaded application state file on based on a notification received from the operator server indicating to download the application state file.

The data channel management controller (180) is connected to IMS public data network (PDN) (186). The IMS PDN (186) is an operator's network dedicated to carry out various features such as voice, Video, IDC, and the like.

At least one of the plurality of modules/components of the data channel management controller (180) may be implemented through an AI model. A function associated with the AI model may be performed through memory (120) and the processor (140). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning can refer to, for example, that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may include a plurality of neural network layers. Each layer has a plurality of weight values and performs a layer operation through calculation of a previous layer and an operation of a plurality of weights. Examples of neural networks include, but are not limited to, a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), and deep Q-networks.

The learning process may, for example, be a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

In an embodiment, the display of the electronic device (100a) may be configured to display the webview on the electronic device (100a). The display is capable of receiving inputs and may include, for example, one of liquid crystal display (LCD), light emitting diode (LED), organic light-emitting diode (OLED), and the like.

Although the FIG. 4 shows various hardware components of the electronic device (100a), it is to be understood that the various embodiments herein are not limited in this respect. In various embodiments, the electronic device (100a) may include less or more components. Further, the labels or names of the components are used only for illustrative purposes and do not limit the scope of the disclosure. One or more components can be combined together to perform the same or substantially similar functions to providing seamless continuity of the data channel session in the electronic device (100a).

Figure 5:
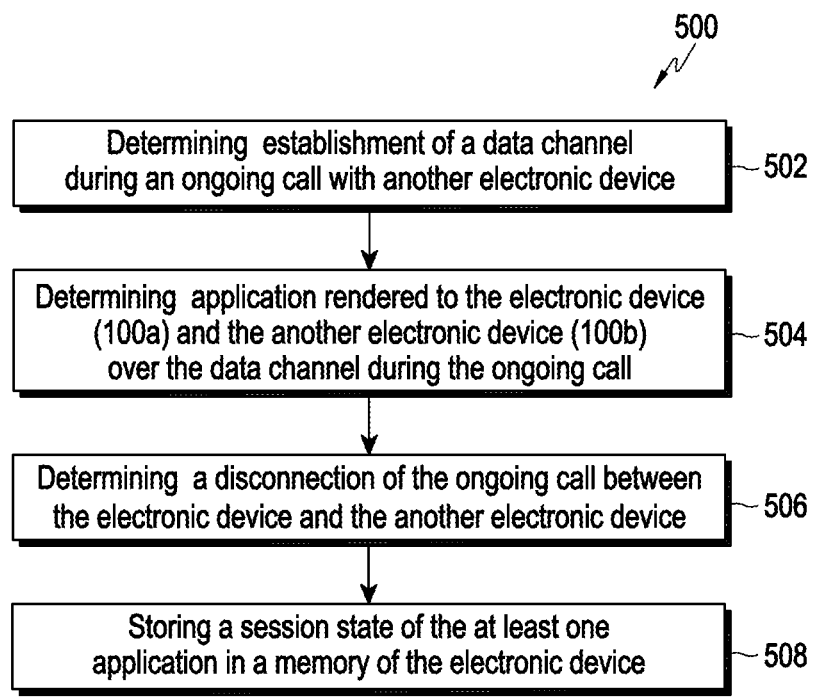
FIG. 5 is a flow chart illustrating an example method for providing seamless continuity of data channel session by the electronic device according to various embodiments.

FIG. 5 is a flow chart (500) illustrating an example method for providing seamless continuity of data channel session by an electronic device (100a), according to various embodiments.

Referring to the FIG. 5, at step 502, the method includes the electronic device (100a) determining the establishment of the data channel during the ongoing call with another electronic device (100b). For example, in the electronic device (100a) described in FIG. 4, the data channel management controller (180) is configured to determine the establishment of a data channel during an ongoing call with another electronic device (100b).

At step 504, the method includes the electronic device (100a) determining the application displayed to the electronic device (100a) and the another electronic device (100b) over the data channel during the ongoing call. For example, in the electronic device (100) described in FIG. 4, the data channel management controller (180) is configured to determine the application displayed to the electronic device (100a) and the another electronic device (100b) over the data channel during the ongoing call.

At step 506, the method includes the electronic device (100a) determining the disconnection of the ongoing call between the electronic device (100a) and the another electronic device (100b). For example, in the electronic device (100a) described in FIG. 4, the data channel management controller (180) is configured to determine the disconnection of an ongoing call between the electronic device (100a) and the another electronic device (100b).

At step 508, the method includes the electronic device (100a) storing the state of the at least one application in the memory (120) of the electronic device (100a). For example, in the electronic device (100a) described in FIG. 4, the data channel management controller (180) is configured to store the state of the at least one application in the memory (120) of the electronic device (100a). The stored state of the at least one application may be used for execution of the at least one application during another call. The seamless continuity of the data channel session related to the another call can be provided using the stored state of the at least one application.

The various actions, acts, blocks, steps, or the like in the flow chart (500) may be performed in the order presented, in a different order, or simultaneously. Further, in various embodiments, some of the actions, acts, blocks, steps, or the like may be omitted, added, modified, skipped, or the like without departing from the scope of the disclosure.

Figure 6:
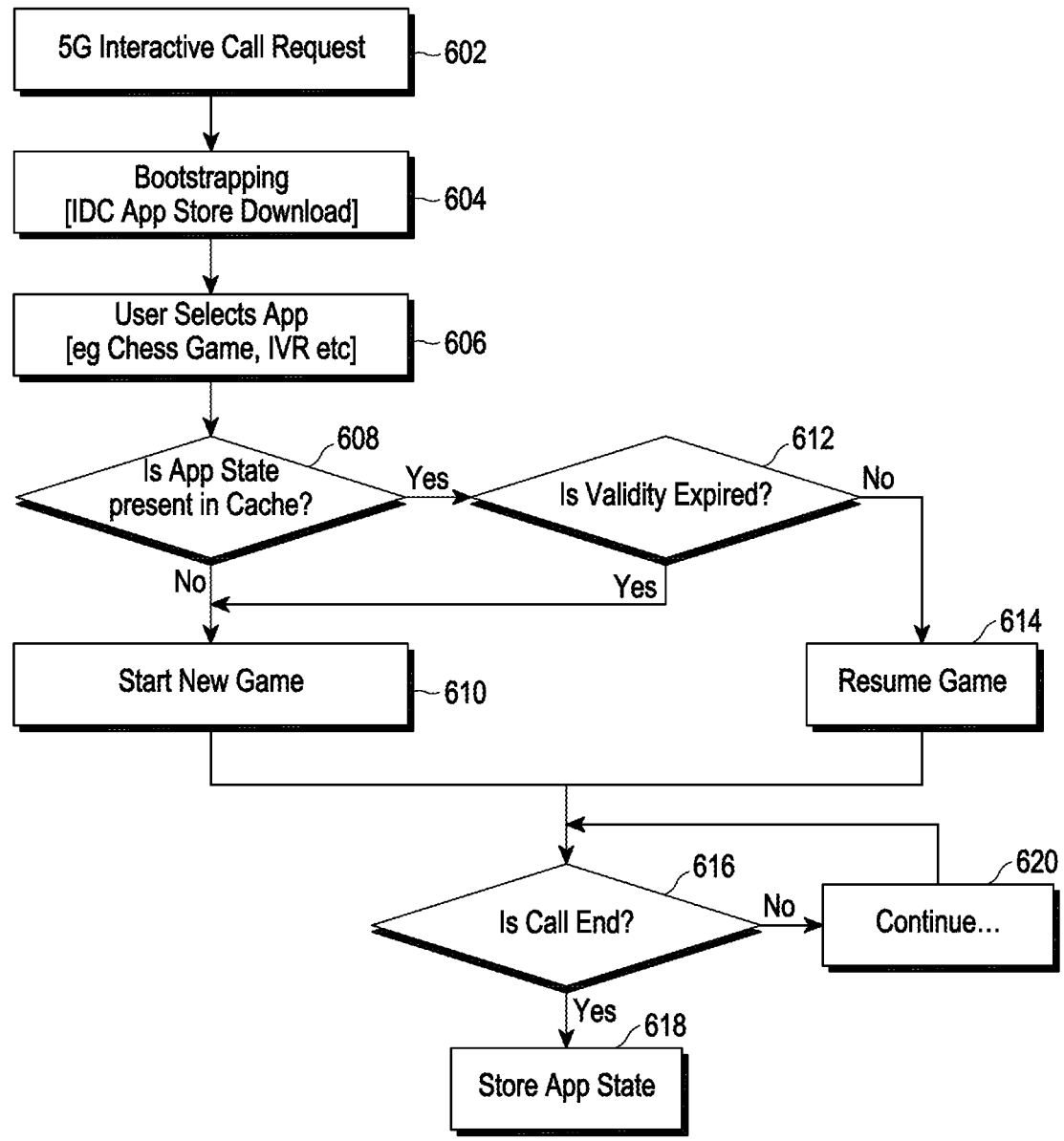
FIG. 6 is a flow chart illustrating an example method for IDC session state continuity on termination of the on-going call according to various embodiments.

FIG. 6 is a flow chart illustrating an example method for IDC session state continuity on termination of an on-going call according to various embodiments. Referring to FIG. 6, at step 602, the electronic device (100a) of the user A requests for the 5G Interactive Call which includes a VoNR along with an IDC session. At step 604, the bootstrap is initiated in the backend of the electronic device (100a) of the user A which mainly performs Creating DataChannels, RTC PeerConnection and SDP negotiation. Once the DataChannels are created, the applications main menu is downloaded from the server through the created data channel and displayed to the user in the webview.

At step 606, the electronic device (100*a*) allows the user A to select any application from the Applications Main Menu. For example, a chess game or the like may be selected. As soon as the application is selected, the application is displayed from the server and loaded on to the webview. At step 608, the electronic device (100*a*) determines whether previously stored cache is available on the electronic device (100*a*).

At step 610, the electronic device (100*a*) has determined that the cache is not present and hence the electronic device (100*a*) starts the application freshly from the beginning. At step 612, the electronic device (100*a*) has determined that the cache is present and then determines whether the validity of the state of the application stored in the cache is expired. In response to determining that the validity of the state of the application stored in the cache is expired, the cache is discarded and the application is started newly at step 610. At step 614, the electronic device (100*a*), in response to determining that the cache is present and the validity of the state of the application stored in the cache is not expired, loads the state of the application stored in the cache to the application so that the application can be continued from the previous state which is stored to the cache.

At step 616, the application monitors and listens to determine the call state, so that when the call gets terminated the application imitates the procedure to store the state of the application by invoking the IMS API.

At step 618, the application determines that the call is ended and invokes the IMS APIs to store the current state of the application along with the condition for determining the validity of the current state of the application. At step 620, any other call state apart from Call End, the application continues regular operation.

Figure 7:
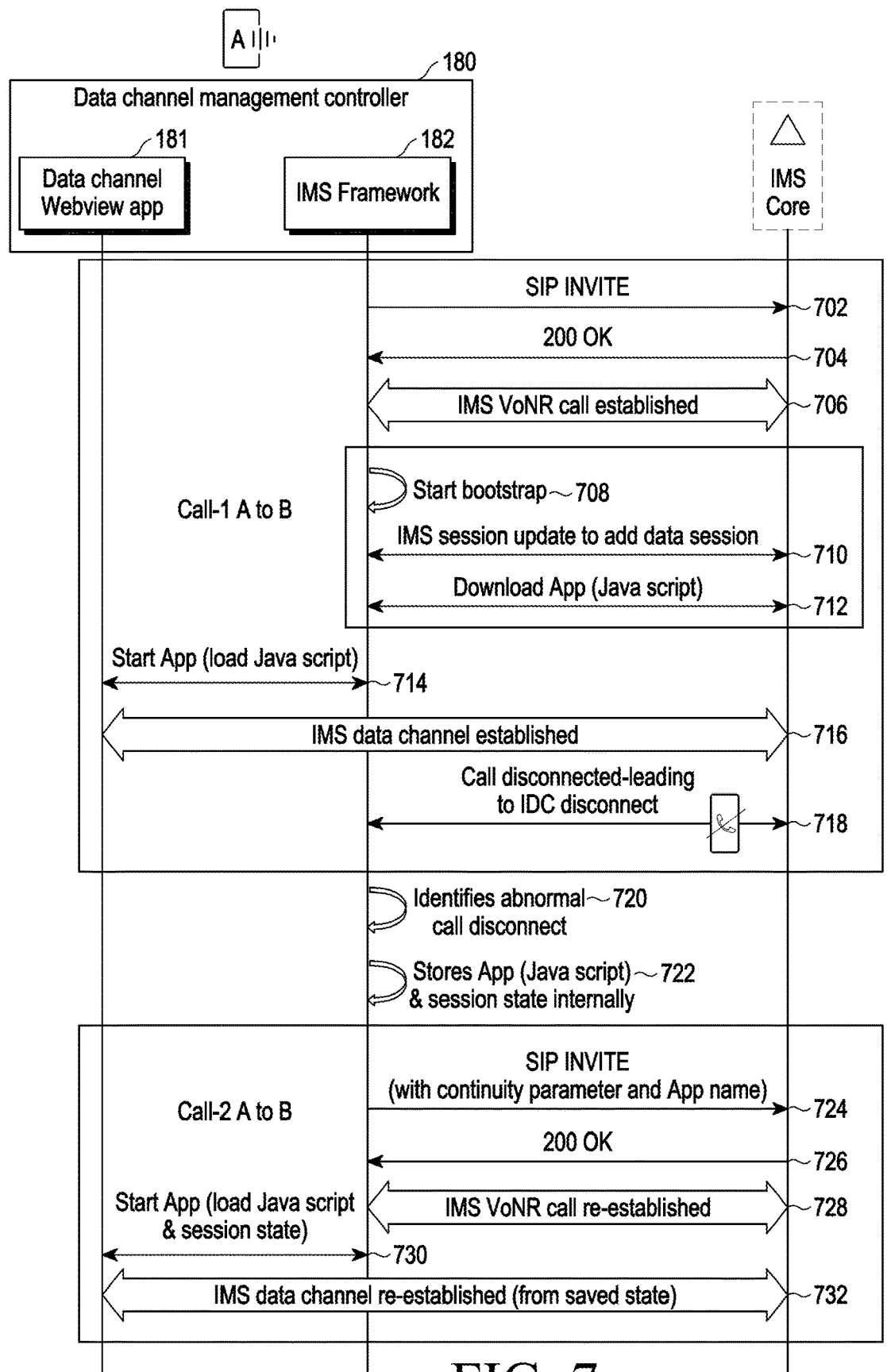
FIG. 7 is a signaling diagram illustrating one-to-one call IDC continuity according to various embodiments.

FIG. 7 is a signaling diagram illustrating one-to-one call IDC Continuity according to various embodiments. Consider that the User A is on a call with the User B and there is an IDC session on-going between the User A and the User B. Now consider that the call gets disconnected. At a later point in time, the User A and the User B establish the call again and resume the IDC session from previous state.

Call 1 scenario between the User A and the user B: the user A establishes an Interactive Call with the User B (steps 702 to 716). The IMS framework (182) performs the bootstrap and downloads Main Menu from the CMC server (204). The User A selects an IDC App and both parties continue with the app session.

At step 718, the call abruptly gets dropped due to a network issue and the IMS indicates a call disconnect indication to the IDC application (step 720).

At step 722, the IDC App stores the state of the application to the memory (120) of the device.

Call 2 scenario between the User A and the user B: the User A re-establishes Call with the User B (steps 724-728). The User A selects the same app again. At step 730, once the App is loaded in the UI, the application will try to fetch the stored session state from the memory (120) of the device. The previous Session state values are initialized to the App and the App will continue from the previous state at step 732.

Figure 8A:
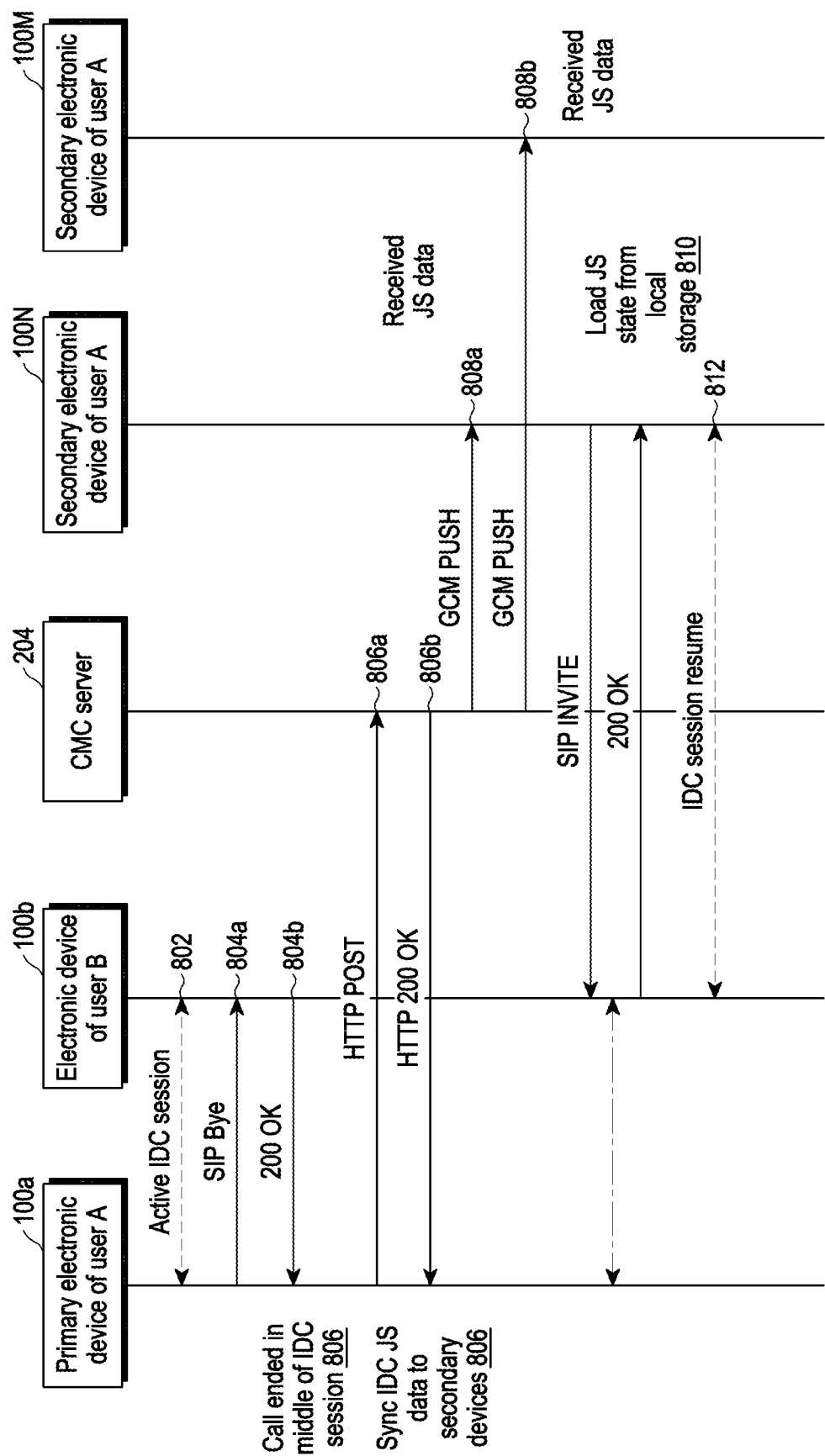
FIG. 8A is a signaling diagram illustrating synchronization of the state of the application between a primary electronic device and a secondary electronic device using the CMC server according to various embodiments.

FIG. 8A is a signaling diagram illustrating synchronization of the state of the application between the primary electronic device (100*a*) and the secondary electronic device (100N) using a CMC server (204) according to various embodiments. Referring to FIG. 8A, consider for example the primary electronic device (100*a*) of the user A is on the VoNR Call with the electronic device (100*b*) of the user B. There is an IDC session which is active during the on-going call between the primary electronic device (100*a*) of the user A and the electronic device (100*b*) of the user B (step 802). The on-going call ends in-between the IDC session (steps 804*a*-804*b*). The user A initiates a new call with the electronic device (100*b*) from the secondary electronic device (100N) using the CMC feature such that the IDC session is to be continued from the state in which it ended when the call ended.

In response to determining that the on-going interactive call between the primary electronic device (100*a*) of the user A and the electronic device (100*b*) of the user B is terminated in the primary electronic device (100*a*), the primary electronic device (100*a*) initiates synchronization of the state of the IDC session, similar to call logs synchronization, (steps 806*a*-806*b*). The synchronization is done using the application state file which includes the application state of the IDC session.

If the application state file including the application state of the IDC session is large in size, then the application state file is uploaded to the CMC server (204) and the URL of the location where the application state file is uploaded is sent to the other secondary electronic devices (100N-100M) to download the application state file along with the state of the application.

As indicated in steps 806*a*-806*b*, the HTTP message carrying the meta data or the URL in the body is sent to the CMC server (204). At steps 808*a*-808*b*, the CMC server (204) sends the GCM PUSH message to the secondary electronic devices (100N-100M). On receiving the PUSH notification, the CMC client in the secondary electronic devices (100N-100M) downloads the meta data content from the CMC server (204), step 810. Further, when the user A initiates or receives the call on any of the secondary electronic devices (100N-100M), then the application state during the IDC session is read from the local storage and the IDC session is resumed (step 812) between any of the secondary electronic devices (100N-100M) and the electronic device (100*b*) of the user B.

Therefore, the methods and systems of the present disclosure can provide a procedure for synchronizing the state of the application which is initiated during the on-going call with the IDC session to the secondary electronic devices (100M-N) of the user.

Figure 8B:
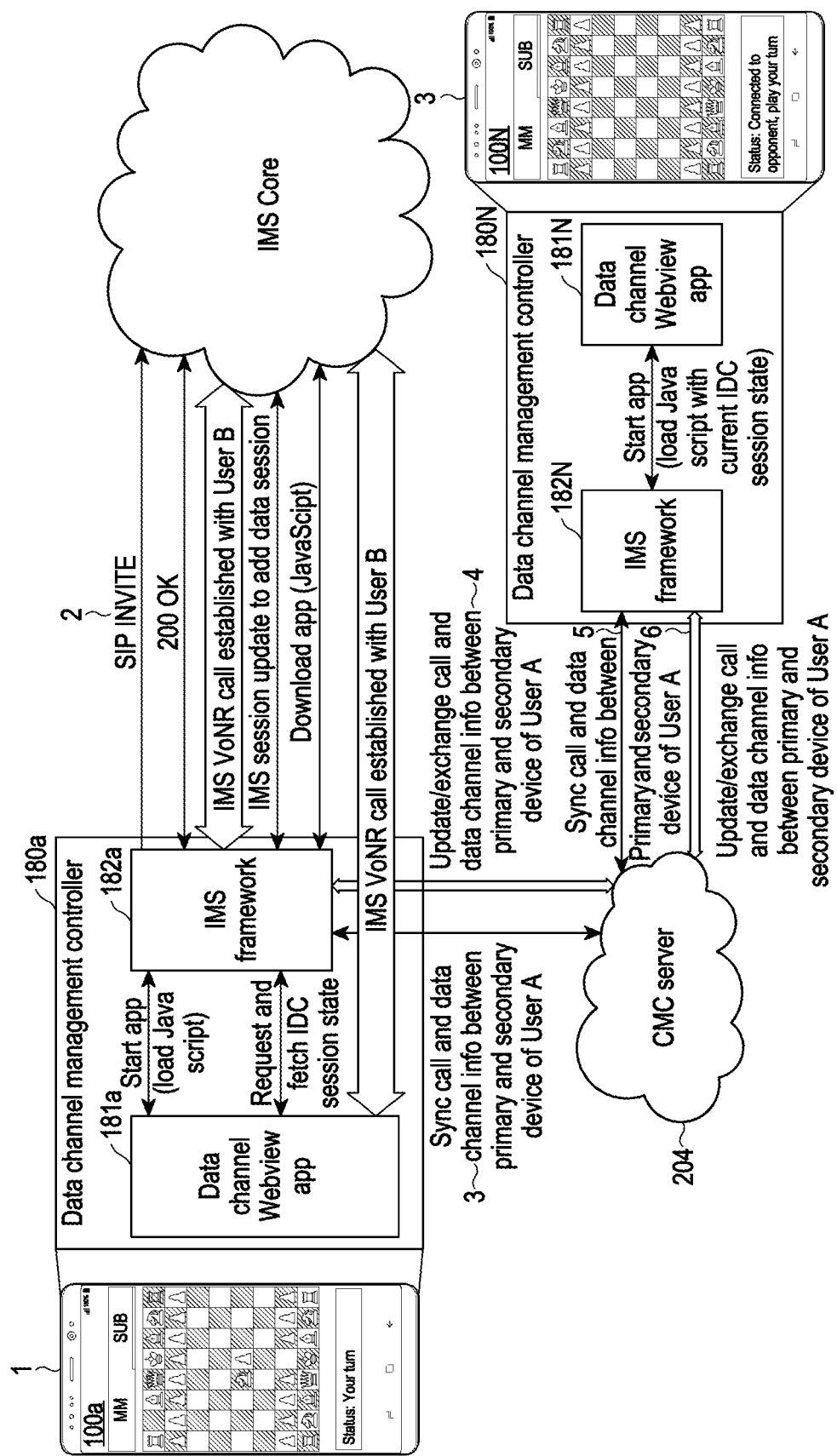
FIG. 8B is a block diagram for synchronization of the state of the application between the primary electronic device and the secondary electronic device using the CMC server according to various embodiments.

FIG. 8B is a diagram for synchronization of the state of the application between the primary electronic device (100*a*) and the secondary electronic device (100N) using the CMC server (204) according to various embodiments.

Referring to the FIG. 8B in conjunction with the FIG. 8A, consider the primary electronic device (100*a*) of the user A (step 1) is a mobile phone and the secondary electronic device (100N) is a tablet. At step 2, consider that the user A is in an on-going call with the user B with the IMS VoNR call being established between the user A and the user B (step 2 indicates the various steps for establishing the IMS VoNR call). Consider that the on-going call between the user A and the user B is disconnected. Then, at step 3 the sync call and data channel info between the primary electronic device (100*a*) and the secondary electronic device (100N) of the User A are performed by the primary electronic device (100*a*) with the CMC server (204). Further, at step 4, the update/exchange call and data channel info between the primary electronic device (100*a*) and the secondary electronic device (100N) of the User A is performed by the primary electronic device (100a) with the CMC server (204).

At step 5, the sync call and data channel info between the primary electronic device (100a) and the secondary electronic device (100N) of the User A are performed by the secondary electronic device (100N) with the CMC server (204). Further, at step 6, the update/exchange call and data channel info between the primary electronic device (100a) and the secondary electronic device (100N) of the User A is performed by the secondary electronic device (100N) with the CMC server (204).

When the User A makes a new call from the secondary electronic device (100N) using the CMC feature, then the IDC session is continued between the secondary electronic device (100N) of the user A and the user B.

Figure 9:
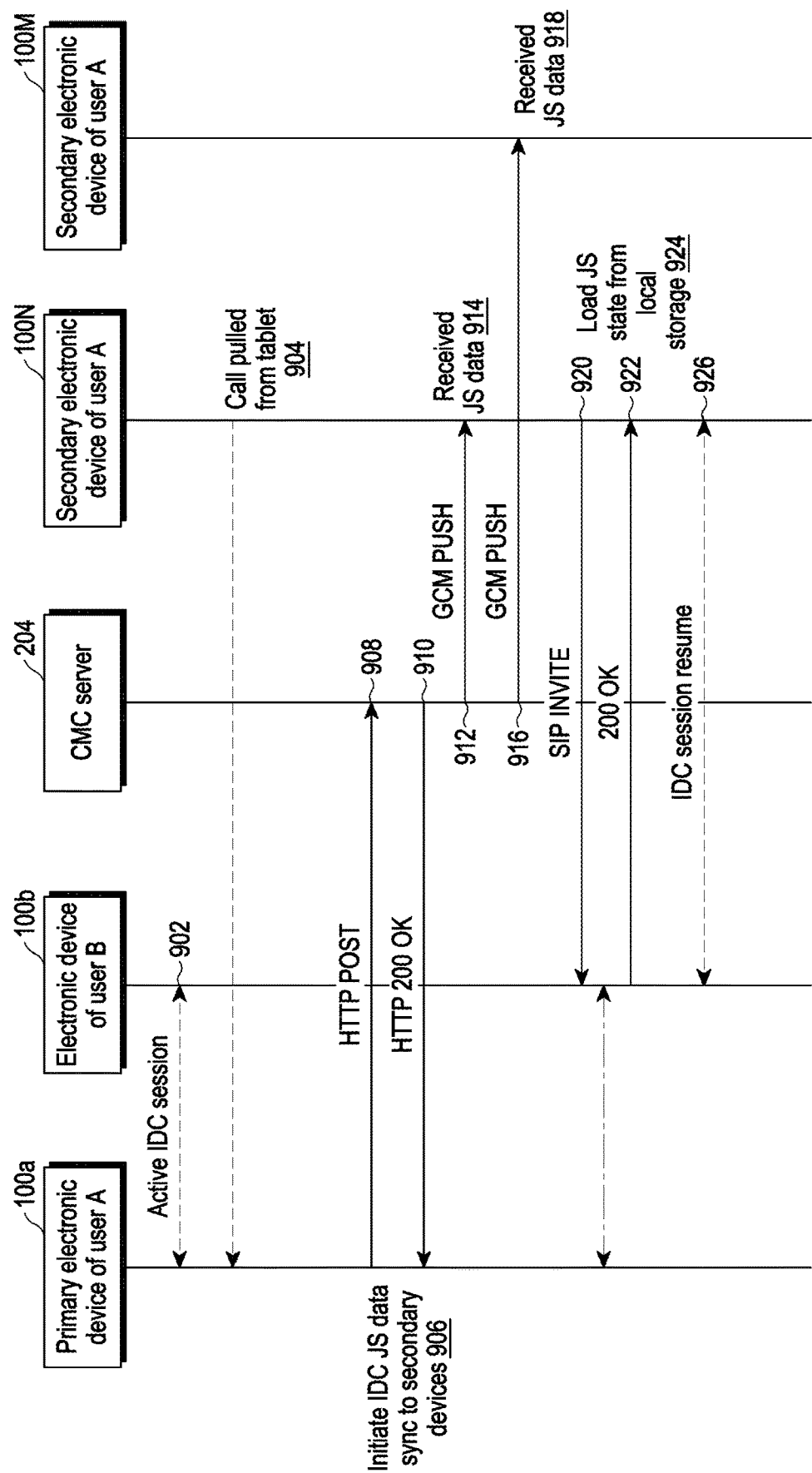
FIG. 9 is a signalling diagram illustrating pulling the IDC call to the secondary electronic device using the Call and Message Continuity (CMC) file storage server according to various embodiments.

FIG. 9 is a signaling diagram illustrating pulling an IDC call to a secondary electronic device (100N) using the Call and Message Continuity (CMC) server (204) according to various embodiments. Referring to the FIG. 9, the flow between the primary electronic device (100a) and the secondary electronic device (100N) for JS state synchronization during call transfer is provided.

Consider an example in which a User A is on a VoNR call with User B. The User A wishes to transfer the on-going call from the primary electronic device (100a) (for example a mobile phone) to the secondary electronic device (100N) (for example a tablet) of the User A. However, the User A wants to continue the IDC session from the secondary electronic device (100N).

At step 902, the primary electronic device (100a) of the user A (Mobile) establishes interactive call with the electronic device (100b) of the user B. While the call is ongoing, the user A tries to pull the call to the secondary electronic device (100N). In response to determining that call pulling is initiated, the IMS framework of the data channel management controller (180) sends the Call Transfer indication to the IDC application. The IDC application will then initiate a procedure for storing the state of the application during the on-going call.

The stored state of the application is uploaded to the CMC server (204) along with the IDC application and the URL is sent to the CMC server (204) in the HTTP Post message. Further, the CMC server (204) sends GCM PUSH message with the URL to the secondary electronic device (100N).

On receiving the PUSH notification with URL, the CMC client in the secondary electronic device (100N) downloads the state of the application and the IDC application from the CMC server (204). Further, as the state of the application and the IDC application is downloaded, the IMS framework of the data channel management controller (180) loads the application in WebView. The IDC application will retrieve the state of the application from the local storage and resume the IDC session. Therefore, the methods and systems of the present disclosure can be used to achieve continuity in multi-device scenario using the CMC server (204).

Figure 10:
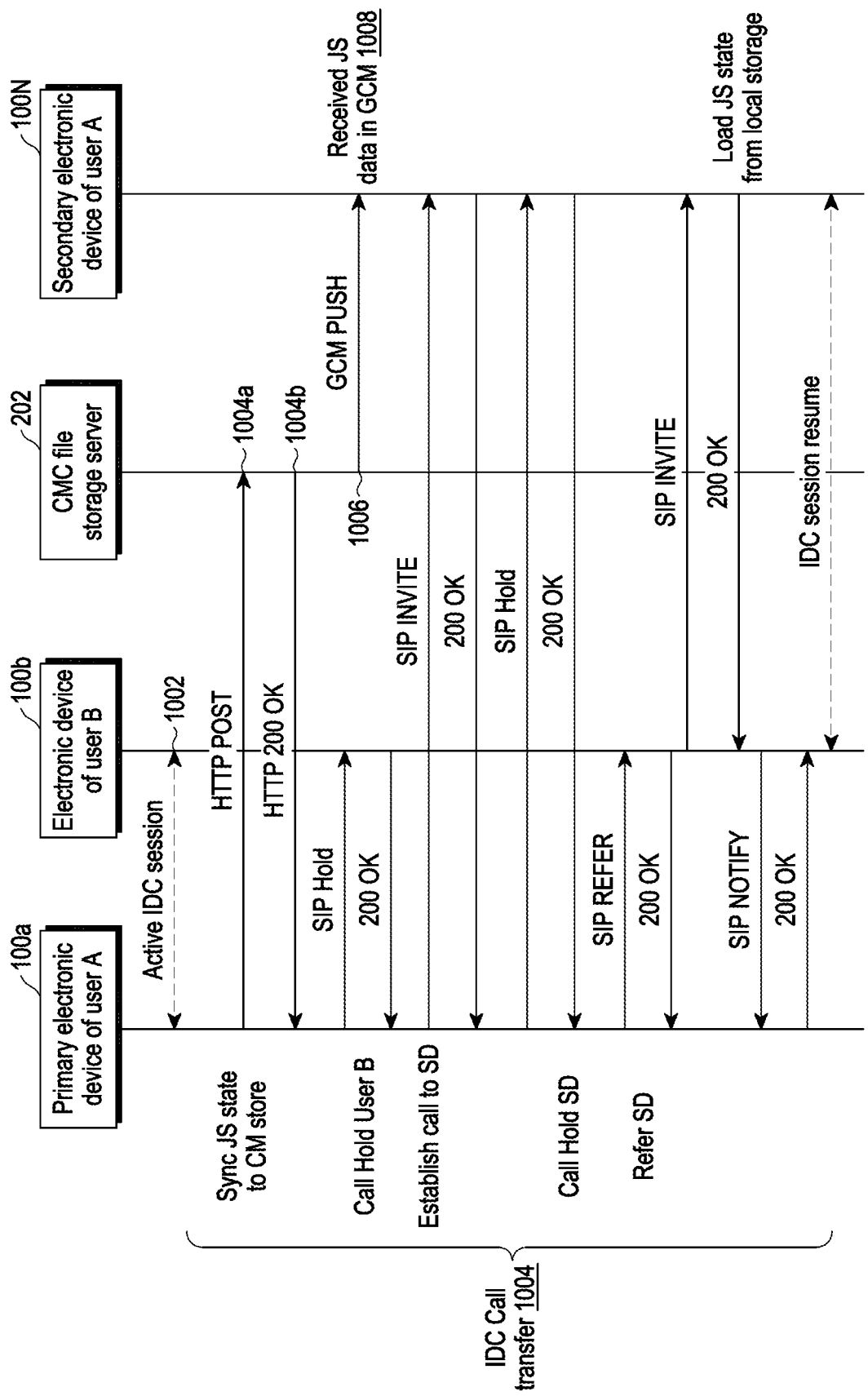
FIG. 10 is a signaling diagram illustrating pulling the IDC call using the infrastructure of the operator according to various embodiments.

FIG. 10 is a signaling diagram illustrating pulling an IDC call using the infrastructure of the operator according to various embodiments. Referring to the FIG. 10, the flow between the primary electronic device (100a) and the secondary electronic device (100N) for the JS state synchronization during call transfer is provided.

Consider an example, where a User A is on a VoNR call with User B. The User A wishes to transfer the on-going call from the primary electronic device (100a) (for example a mobile phone) to the secondary electronic device (100N) (for example a tablet) of the User A. However, the User A wants to continue the IDC session from the secondary electronic device (100N).

At step 1002, the primary electronic device (100a) of the user A establishes an interactive call with the electronic device (100b) of the user B. While the call is ongoing, the user A tries to pull the call from the primary electronic device (100a) to the secondary electronic device (100N), as indicated in the multiple steps in 1004.

In response to determining that call pulling is initiated, the IMS framework of the data channel management controller (180) sends the Call Transfer indication to the IDC application which is running on the primary electronic device (100a) of the user A. The IDC application will then initiate the procedure storing the state of the application during the on-going call.

The stored state of the application is uploaded to the DataStore server (202) of the operator or the CMC file storage server (202) or an operator server (not shown) and the URL where the file comprising the state of the application is sent to the operator server (206), as indicated in the steps 1004a-1004b. At step 1006, the CMC file storage server (202) sends GCM PUSH message with the URL to the secondary electronic device (100N) of the user A.

On receiving the PUSH notification with the URL, a client associated with the server in the secondary electronic device (100N) will download the state of the application (step 1008). Further, the secondary electronic device (100N) of the User A will initiate bootstrap and download the applications Menu from the server (202). The user A selects the same application to continue. The IDC App will retrieve the state of the application from the local storage and resumes the session on the secondary electronic device (100N).

Therefore, the methods and systems of the present disclosure can avoid the real time problem of the IDC Context being lost when an IDC based voice call gets terminated. Here, the methods and systems of the present disclosure can achieve continuity in a multi-device scenario by using the network and infrastructure of the operator. The proposed method has scope of Change Request with 3GPP or GSMA or W3C to expose new APIs for IDC apps to communicate with IMS Framework.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for communication by an electronic device, the method comprising:
    determining establishment of a data channel between the electronic device and another electronic device during an already ongoing call between the electronic device and the another electronic device;
    determining at least one application which is displayed on the electronic device and the another electronic device and uses the data channel during the ongoing call;
    determining a disconnection of the ongoing call between the electronic device and the another electronic device while the at least one application is being executed;
    storing a state of the at least one application in a memory of the electronic device based on determining the disconnection of the ongoing call;
    re-establishing the disconnected call between the electronic device and the another electronic device;
    determining a selection of the at least one application to be displayed on the electronic device and the another electronic device during the re-established call; and
    displaying the stored state of the at least one application during the re-established call.

2. The method of claim 1, wherein the state of the at least one application is stored in the memory of the electronic device using at least one application programming interface (API).

3. The method of claim 1, further comprising:
    determining an availability of the state of the at least one application in the memory of the electronic device;
    determining a validity of the state of the at least one application is not expired, in response to determining the availability of the state of the at least one application in the memory of the electronic device;
    retrieving the state of the at least one application from the memory of the electronic device using an API;
    loading the retrieved state of the at least one application; and
    displaying the retrieved state of the at least one application on the electronic device and the another electronic device to provide continuity in a data channel session.

4. The method of claim 3, further comprising:
    determining the validity of the state of the at least one application is expired;
    discarding the state of the at least one application stored in the memory of the electronic device, in response to determining that the validity of the state of the at least one application is expired; and
    starting the at least one application with a new session state over the data channel.

5. The method of claim 1, further comprising:
    synchronizing with a Call and Message Continuity (CMC) file storage server, in response to determining the disconnection of the ongoing call between the electronic device and the another electronic device;
    uploading an application state file to the CMC file storage server using an HTTP mechanism, wherein the application state file comprises the state of the at least one application; and
    sending a uniform resource locator (URL) of the uploaded application state file in the CMC file storage server to a CMC server,
    wherein the CMC server sends the URL to the another electronic device to enable the another electronic device to download the application state file from the CMC file storage server and provide continuity in a data channel session.

6. The method of claim 1, further comprising:
    determining a call pulling activity is initiated for the ongoing call to a different electronic device;
    indicating a call transfer to the at least one application using an IMS framework;
    storing the state of the at least one application in the memory of the electronic device using an API;
    uploading an application state file to at least one of a CMC file storage server or an operator server, wherein the application state file comprises the state of the at least one application; and
    sending a URL of the uploaded application state file in at least one of the CMC file storage server or the operator server, to the different electronic device to enable the different electronic device to download the application state file and provide continuity in a data channel session.

7. An electronic device comprising:
    memory storing instructions; and
    at least one processor coupled to the memory, wherein the instructions, when executed by the at least one processor, cause the electronic device to perform operations comprising:
        determining establishment of a data channel between the electronic device and another electronic device during an already ongoing call between the electronic device and the another electronic device;
        determining at least one application which is displayed on the electronic device and the another electronic device and uses the data channel during the ongoing call;
        determining a disconnection of the ongoing call between the electronic device and the another electronic device while the at least one application is being executed;
        storing a state of the at least one application in the memory based on determining the disconnection of the ongoing call;
        re-establishing the disconnected call between the electronic device and the another electronic device;
        determining a selection of the at least one application to be displayed on the electronic device and the another electronic device during the re-established call; and,
        displaying the stored state of the at least one application during the re-established call.

8. The electronic device of claim 7, wherein the state of the at least one application is stored in the memory of the electronic device using at least one application programming interface, API.

9. The electronic device of claim 7, wherein the operations further comprise:
    determining an availability of the state of the at least one application in the memory of the electronic device;
    determining a validity of the state of the at least one application is not expired, in response to determining the availability of the state of the at least one application in the memory of the electronic device;
    retrieving the state of the at least one application from the memory of the electronic device using an API;
    loading the retrieved state of the at least one application; and
    displaying the retrieved state of the at least one application on the electronic device and the another electronic device to provide continuity in a data channel session.

10. The electronic device of claim 9, wherein the operations further comprise:
   determining the validity of the state of the at least one application is expired;
   discarding the state of the at least one application stored in the memory of the electronic device, in response to determining that the validity of the state of the at least one application is expired; and
   starting the at least one application with a new session state over the data channel.

11. The electronic device of claim 7, wherein the operations further comprise:
   synchronizing with a Call and Message Continuity, CMC, file storage server, in response to determining the disconnection of the ongoing call between the electronic device and the another electronic device;
   uploading an application state file to the CMC file storage server using an HTTP mechanism, wherein the application state file comprises the state of the at least one application; and
   sending a uniform resource locator, URL, of the uploaded application state file in the CMC file storage server to a CMC server,
   wherein the CMC server sends the URL to the another electronic device to enable the another electronic device to download the application state file from the CMC file storage server and provide continuity in a data channel session.

12. The electronic device of claim 7, wherein the operations further comprise:
   determining a call pulling activity is initiated for the ongoing call to a different electronic device;
   indicating a call transfer to the at least one application using an IMS framework;
   storing the state of the at least one application in the memory of the electronic device using an API;
   uploading an application state file to at least one of a CMC file storage server or an operator server, wherein the application state file comprises the state of the at least one application; and
   sending a URL of the uploaded application state file in at least one of the CMC file storage server or the operator server, to the different electronic device to enable the different electronic device to download the application state file and provide continuity in a data channel session.

13. A non-transitory computer readable storage medium storing instructions which, when executed by at least one processor of an electronic device, causes the electronic device to perform operations, the operations comprising:
   determining establishment of a data channel between the electronic device and another electronic device during an ongoing call between the electronic device and the another electronic device;
   determining at least one application which is displayed on the electronic device and the another electronic device and uses the data channel during the ongoing call;
   determining a disconnection of the ongoing call between the electronic device and the another electronic device while the at least one application is being executed;
   storing a state of the at least one application in a memory of the electronic device based on determining the disconnection of the ongoing call;
   re-establishing the disconnected call between the electronic device and the another electronic device;
   determining a selection of the at least one application to be displayed on the electronic device and the another electronic device during the re-established call; and,
   displaying the stored state of the at least one application during the re-established call.

14. The non-transitory computer readable storage medium of claim 13, wherein the state of the at least one application is stored in the memory of the electronic device using at least one application programming interface (API).

15. The non-transitory computer readable storage medium of claim 13, wherein the operations further comprise:
   determining an availability of the state of the at least one application in the memory of the electronic device;
   determining a validity of the state of the at least one application is not expired, in response to determining the availability of the state of the at least one application in the memory of the electronic device;
   retrieving the state of the at least one application from the memory of the electronic device using an API;
   loading the retrieved state of the at least one application; and
   displaying the retrieved state of the at least one application on the electronic device and the another electronic device to provide continuity in a data channel session.

16. The non-transitory computer readable storage medium of claim 15, wherein the operations further comprise:
   determining the validity of the state of the at least one application is expired;
   discarding the state of the at least one application stored in the memory of the electronic device, in response to determining that the validity of the state of the at least one application is expired; and
   starting the at least one application with a new session state over the data channel.

17. The non-transitory computer readable storage medium of claim 13, wherein the operations further comprise:
   synchronizing with a Call and Message Continuity (CMC) file storage server, in response to determining the disconnection of the ongoing call between the electronic device and the another electronic device;
   uploading an application state file to the CMC file storage server using an HTTP mechanism, wherein the application state file comprises the state of the at least one application; and
   sending a uniform resource locator (URL) of the uploaded application state file in the CMC file storage server to a CMC server,
   wherein the CMC server sends the URL to the another electronic device to enable the another electronic device to download the application state file from the CMC file storage server and provide continuity in a data channel session.

18. The non-transitory computer readable storage medium of claim 13, wherein the operations further comprise:
   determining a call pulling activity is initiated for the ongoing call to a different electronic device;
   indicating a call transfer to the at least one application using an IMS framework;
   storing the state of the at least one application in the memory of the electronic device using an API;
   uploading an application state file to at least one of a CMC file storage server or an operator server, wherein the application state file comprises the state of the at least one application; and sending a URL of the uploaded application state file in at least one of the CMC file storage server or the operator server, to the different electronic device to enable the different electronic device to download the application state file and provide continuity in a data channel session.

\* \* \* \* \*